United States Patent
Larsson et al.

(10) Patent No.: US 10,404,525 B2
(45) Date of Patent: Sep. 3, 2019

(54) CLASSIFICATION OF DETECTED NETWORK ANOMALIES USING ADDITIONAL DATA

(71) Applicant: Telefonaktiebolaget LM Ericsson (publ), Stockholm (SE)

(72) Inventors: Tony Larsson, Upplands Väsby (SE); Tor Kvernvik, Täby (SE); Simon Moritz, Stockholm (SE); Nicolas Seyvet, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 79 days.

(21) Appl. No.: 15/026,502

(22) PCT Filed: Oct. 18, 2013

(86) PCT No.: PCT/EP2013/071902
§ 371 (c)(1),
(2) Date: Mar. 31, 2016

(87) PCT Pub. No.: WO2015/055259
PCT Pub. Date: Apr. 23, 2015

(65) Prior Publication Data
US 2016/0254944 A1    Sep. 1, 2016

(51) Int. Cl.
*H04L 12/24*  (2006.01)
*H04W 24/04*  (2009.01)
(Continued)

(52) U.S. Cl.
CPC ........ *H04L 41/0613* (2013.01); *H04L 41/064* (2013.01); *H04L 41/0604* (2013.01);
(Continued)

(58) Field of Classification Search
None
See application file for complete search history.

(56) References Cited

U.S. PATENT DOCUMENTS 6,141,565 A * 10/2000 Feuerstein ............ H04W 16/06
455/422.1
6,314,533 B1 * 11/2001 Novik ............... G06F 17/30516
707/999.003
(Continued)

FOREIGN PATENT DOCUMENTS

| CN | 1767452 A | 5/2006 |
| WO | WO 2008/121945 A2 | 10/2008 |
| WO | WO 2010/114363 A1 | 10/2010 |

OTHER PUBLICATIONS

International Search Report and Written Opinion of the International Searching Authority, Application No. PCT/EP2013/071902, dated Aug. 13, 2014.
(Continued)

*Primary Examiner* — Faruk Hamza
*Assistant Examiner* — Cassandra L Decker
(74) *Attorney, Agent, or Firm* — Sage Patent Group

(57) ABSTRACT

A network anomaly detector detects a network anomaly by monitoring a communication network and provides an indication of the detected network anomaly to a network anomaly analyzer. The network anomaly analyzer receives the indication of the detected network anomaly and, on the basis of data representing the detected network anomaly and additional data, e.g., from outside the communication network, performs classification of the detected network anomaly. Depending on the classification of the detected network anomaly, the network anomaly analyzer provides a report of the detected network anomaly to another node. If for example the detected network anomaly is classified as expected behavior, reporting of the detected network anomaly may be suppressed.

19 Claims, 9 Drawing Sheets

(51) Int. Cl.
  *H04L 12/26* (2006.01)
  *H04L 29/06* (2006.01)

(52) U.S. Cl.
  CPC ........ *H04L 41/065* (2013.01); *H04L 41/0618* (2013.01); *H04L 41/14* (2013.01); *H04L 41/142* (2013.01); *H04L 43/067* (2013.01); *H04L 63/1425* (2013.01); *H04W 24/04* (2013.01)

(56) References Cited

U.S. PATENT DOCUMENTS

| | | | | |
|---|---|---|---|---|
| 8,341,106 | B1* | 12/2012 | Scolnicov | G06N 7/005 |
| | | | | 702/50 |
| 8,577,332 | B1* | 11/2013 | Quint | H04W 4/24 |
| | | | | 455/406 |
| 2006/0047807 | A1 | 3/2006 | Magnaghi et al. | |
| 2006/0106743 | A1* | 5/2006 | Horvitz | G06N 99/005 |
| | | | | 706/21 |
| 2006/0173992 | A1* | 8/2006 | Weber | H04L 63/1425 |
| | | | | 709/224 |
| 2006/0285489 | A1* | 12/2006 | Francisco | H04L 12/2859 |
| | | | | 370/229 |
| 2007/0180103 | A1* | 8/2007 | Atkins | H04L 41/065 |
| | | | | 709/224 |
| 2008/0208526 | A1 | 8/2008 | Thibaux et al. | |
| 2010/0290346 | A1* | 11/2010 | Barford | H04L 41/064 |
| | | | | 370/242 |
| 2012/0173710 | A1* | 7/2012 | Rodriguez | H04L 43/026 |
| | | | | 709/224 |
| 2012/0233311 | A1* | 9/2012 | Parker | H04L 43/00 |
| | | | | 709/224 |
| 2013/0121175 | A1* | 5/2013 | Carlin | H04W 24/04 |
| | | | | 370/252 |
| 2014/0109223 | A1* | 4/2014 | Jin | H04L 63/1408 |
| | | | | 726/23 |
| 2014/0207936 | A1* | 7/2014 | Friedlander | H04L 43/0882 |
| | | | | 709/224 |
| 2014/0370843 | A1* | 12/2014 | Cama | H04W 24/08 |
| | | | | 455/405 |

OTHER PUBLICATIONS

Paschalidis et al., "Spatio-Temporal Network Anomaly Detection by Assessing Deviations of Empirical Measures", *IEEE/ACM Transactions on Networking*, vol. 17, No. 3, Jun. 2009, pp. 685-697.

Thottan et al., "Anomaly Detection Approaches for Communication Networks", *Algorithms for Next Generation Networks*, Cormode et al., ed., Springer, London, 2010, pp. 239-261.

Wikipedia, the free encyclopedia, "Euclidean distance", downloaded Mar. 30, 2016 from https://en.wikipedia.org/wiki/Euclidean_distance, 4 pp.

Office Action for Chinese Application No. 201380080326.3 dated Jul. 2, 2018 (6 pages).

* cited by examiner

CLASSIFICATION OF DETECTED NETWORK ANOMALIES USING ADDITIONAL DATA

CROSS REFERENCE TO RELATED APPLICATION

This application is a 35 U.S.C. § 371 national stage application of PCT International Application No. PCT/EP2013/071902, filed on Oct. 18, 2013, the disclosure and content of which is incorporated by reference herein in its entirety. The above-referenced PCT International Application was published in the English language as International Publication No. WO 2015/055259 A1 on Apr. 23, 2015.

TECHNICAL FIELD

The present invention relates to methods for analyzing network anomalies and to corresponding devices.

BACKGROUND

In communication networks, e.g., a cellular network as specified by 3GPP ($3^{rd}$ Generation Partnership Project) detection of network anomalies may be used for better supporting management and maintenance of the communication network. For example, a detected network anomaly may be indicative of a faulty network component or of insufficient network infrastructure.

An network anomaly detector used for such purposes may monitor the communication network to detect unusual patterns in network data. Such patterns may for example be defined in terms of the amount of data traffic being higher than usual, the number of unsuccessful voice calls being higher than usual, or the like. That is to say, the network anomalies may be detected as a deviations from normal (e.g., average) network behavior. Since the detected network anomaly may be indicative of a critical state of the communication network, e.g., of a faulty network component, it may be used to trigger an alarm. An example of a corresponding anomaly detection system, which uses time-series data from the network as input, is described in US 2008/0208526 A1.

However, because the operation conditions of a communication network may vary considerably in realistic scenarios, the distinction between normal behavior and deviations therefrom may be a complex task. This may have the effect that a detected network anomaly actually corresponds to expected behavior in the given conditions. To give an example, a network anomaly which is detected due to the amount of data traffic being higher than usual may be due to a major event at a certain place in the coverage region of the communication network, e.g., a sports event or cultural event attracting large audience. In such a case, the detected network anomaly may be deemed as uncritical and generating an alarm is not necessary.

Accordingly, there is a need for techniques which allow for efficient handling of network anomalies.

SUMMARY

According to an embodiment of the invention, a method for analyzing network anomalies in a communication network is provided. According to the method, an indication of a network anomaly is received, which was detected by monitoring the communication network. On the basis of data representing the detected network anomaly and one the basis of additional data, classification of the detected network anomaly is performed. Depending on the classification of the detected network anomaly, a report of the detected network anomaly is provided.

According to a further embodiment of the invention, a device for analyzing network anomalies in a communication network is provided. The device comprises at least one processor. The at least one processor is configured to receive an indication of a network anomaly which was detected by monitoring the communication network. Further, the at least one processor is configured to perform, on the basis of data representing the detected network anomaly and on the basis of additional data, classification of the detected network anomaly. Still further, the at least one processor is configured to provide, depending on the classification of the detected network anomaly, a report of the detected network anomaly. The device may comprise an interface for receiving the indication of the detected network anomaly from a network anomaly detector. The device may also comprise an interface for sending the report of the detected anomaly.

According to a further embodiment of the invention, a system for analyzing network anomalies in a communication network is provided. The system comprises a network anomaly detector and a network anomaly analyzer. The network anomaly detector is configured to detect a network anomaly by monitoring the communication network and provide an indication of the detected network anomaly to the network anomaly analyzer. The network anomaly analyzer is configured to receive the indication of the detected network anomaly and, on the basis of data representing the detected network anomaly and additional data, perform classification of the detected network anomaly. Further, the network anomaly analyzer is configured to provide, depending on the classification of the detected network anomaly, a report of the detected network anomaly.

According to a further embodiment of the invention, a computer program is provided. The computer program comprises program code to be executed by at least one processor of a device for analyzing network anomalies in a communication network. Execution of the program code causes the at least one processor to receive an indication of a network anomaly which was detected by monitoring the communication network. Further, execution of the program code causes the at least one processor to perform, on the basis of data representing the detected network anomaly and on the basis of additional data, classification of the detected network anomaly. Still further, execution of the program code causes the at least one processor to provide, depending on the classification of the detected network anomaly, a report of the detected network anomaly.

DETAILED DESCRIPTION OF EMBODIMENTS

Figure 1:
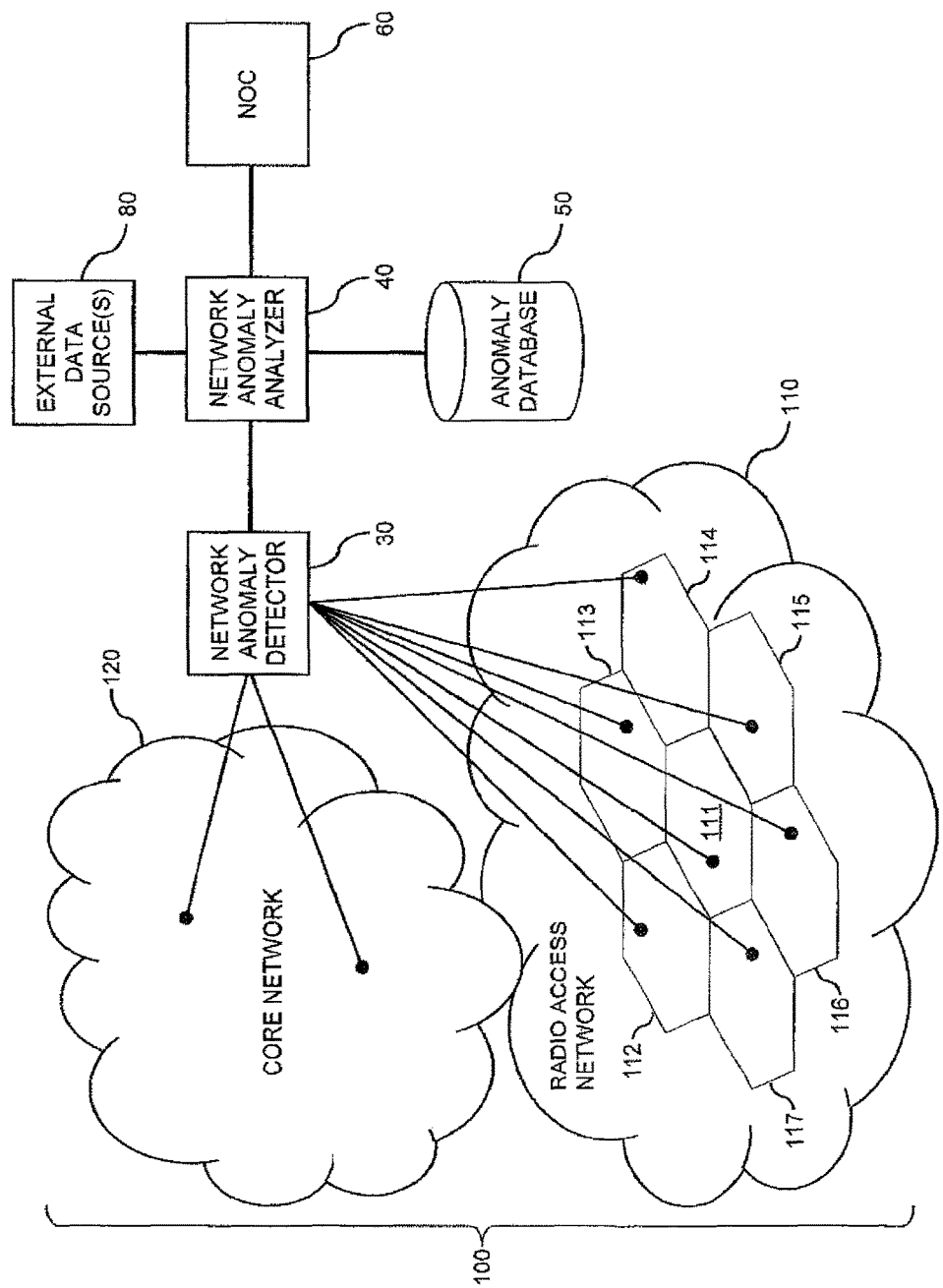
FIG. 1 schematically illustrates an exemplary communication network environment in which analysis of network anomalies is implemented in accordance with an embodiment of the invention may be applied.

In the following, concepts according to embodiments of the invention will be explained in more detail by referring to the accompanying drawings. The illustrated concepts relate to analysis network anomalies in a communication network, in particular a cellular communication network, e.g., as specified by 3GPP. The communication network may support various radio access technologies, e.g., GSM (Global System for Mobile communication), UMTS (Universal Terrestrial Mobile Telecommunications System) or Wideband CDMA (Code Division Multiple Access), CDMA2000, WiMaX, or LTE (Long Term Evolution). However, it is to be understood that the illustrated concepts could also be applied to other kinds of communication networks, e.g., using wire based access technologies such as Digital Subscriber Line (DSL), coaxial cable, or optical fibre, or Internet Protocol (IP) based local area networks (LANs) or wide area networks (WANs).

In the illustrated concepts, a two-stage process for analysis of network anomalies is assumed. In a first stage, network anomalies are detected by monitoring the communication network. For this purpose, various known mechanisms for analyzing network data may be applied, e.g., as described in "Anomaly Detection Approaches for Communication Networks", by M. Thottan et al., from Algorithms for Next Generation Networks, Computer Communications and Networks, Springer London (2010), pp. 239-261. Generally, such mechanisms may be based on detecting a deviation of one or more attributes of the network data from the normal occurrence of these attributes. This may be accomplished by using a model-based algorithm and/or by a statistical algorithm. In a second stage, the network anomalies detected in the first stage are subjected to further analysis. This analysis is based on data representing the detected network anomaly, e.g., in terms of time and/or location, and on additional data. Such additional data may for example include information from outside the communication network, in the following also referred to as external data. Examples of such external data are weather data providing information on the weather in a service area of the communication network, event schedules providing information on events in a service area of the communication network, information on other events, such as a disaster, information from social media or social networking platforms, or information from utility suppliers operating in the service area of the communication network. In addition or alternatively, the additional data may include historic information on previously detected network anomalies. The analysis of the second stage is performed to obtain a classification of the detected network anomaly. For example, the detected network anomaly may be classified as expected behavior or unexpected behavior. Further, the classification could be used to distinguish between different kinds of network anomalies, e.g., component failure related, overload related, or the like.

FIG. 1 schematically illustrates the communication network 100 and components of a system for implementing the two stage process for analysis of network anomalies. As illustrated, the communication network 100 may include a radio access network 110 with a plurality of cells 111, 112, 113, 114, 115, 116 for allowing access of user equipments (UEs) to the communication network 100. Further, the communication network 100 may include a core network 120. In a known manner, the core network 120 may provide functionalities for controlling the radio access network 110, e.g., with respect to mobility, charging, or quality of service. Further, the core network 120 may also provide connectivity to other communication networks, e.g., the Internet. Still further, the core network may provide certain services to the UEs, e.g., multimedia services.

A network anomaly detector 30 is provided for implementing the first stage of the analysis process. As illustrated, the network anomaly detector 30 may be coupled to various nodes in the communication network 100 to allow monitoring of the communication network 100. As illustrated, these nodes may be in the radio access network 110 and/or in the core network 120. The monitoring may be performed on the basis of various kinds of network data. Such network data may for example include data plane traffic, e.g., when monitoring the traffic load. Further, such network data may include control plane traffic, e.g., when monitoring successful or unsuccessful connection setup procedures, successful or unsuccessful handovers between cells 111, 112, 113, 114, 115, 116, successful or unsuccessful attempts of sending messages by UEs, congestion indications, alarm messages, trouble tickets, or the like. The network data may be analyzed with respect to the occurrence of one or more attributes over time and/or in at a given location. As mentioned above, the network anomaly detector 30 may apply various algorithms for detecting network anomalies by monitoring the network data.

A network anomaly analyzer 40 is provided for implementing the second stage of the analysis process. The network anomaly analyzer 40 is coupled to the network anomaly detector 30 to receive indications of the network anomalies detected by the network anomaly detector 30. Such indications may include data representing the detected network anomaly, e.g., in terms of time and/or location of the detected network anomaly. The data representing the detected network anomaly may also include a pattern of one or more attributes which characterize the detected network anomaly.

As further illustrated, the network anomaly analyzer 40 may be coupled to an anomaly database 50. The anomaly database 50 may for example store anomaly patterns of previously detected network anomalies. Further, the anomaly database 50 could also store anomaly models describing known kinds of network anomalies.

A further illustrated, the network anomaly analyzer 40 is coupled to one or more external data sources 80. Such external data source(s) 80 may be used to provide information from outside the communication network 100 which is potentially related to a detected network anomaly. For example, external data from the external data source(s) 80 could include weather information or information from an event schedule. Exemplary information from an event schedule may for example include a name of the event, a start date and/or time of the event, an end date and/or time of the event, a duration of the event, a location of the event, a repetition pattern of the event, or the like.

The network anomaly analyzer 40 may thus utilize the external data from the external data source(s) and/or the data from the anomaly database 50 for further analyzing a detected network anomaly. As mentioned above, this further analysis aims at classification of the detected network anomaly. Depending on the classification, the network anomaly analyzer 40 may then provide a report of the detected network anomaly. The report may for example include an alarm. For example, if the detected network anomaly if classified as unexpected behavior, the network anomaly analyzer 40 may send a report of the detected network anomaly to another node, in the illustrated example corresponding to a network operations center (NOC) 60. Here, it should be understood that the network anomaly analyzer may send reports to various kinds of nodes or even multiple nodes which need to receive reports of detected network anomalies, e.g., a node aggregating information for business management, a node aggregating information for infrastructure planning, or a node aggregating information for other purposes, e.g., scheduling working personnel, making commercial offers to people in the service area of the communication network. If on the other hand the detected network anomaly is classified as expected behavior, the reporting of the detected network anomaly may be suppressed, e.g., by not sending a report or not considering the detected network anomaly in a report. In this way unnecessary reporting or setting off false alarms may be avoided. Also, automated or manual analysis of such reports may be facilitated by prioritizing relevant information.

In an exemplary scenario, the detected network anomaly could correspond to increased SMS (Short Message Service) traffic during a major public event attracting large audience, e.g., a football game, which is expected behavior. The external data may in turn include information from an event schedule which specifies the time of the event. By correlation of the time of the detected network anomaly and the scheduled time of the event, the network anomaly analyzer may classify the detected network anomaly as expected behavior and refrain from sending a report of the detected anomaly to the NOC 60. In some implementations also more complex filtering criteria may defined for controlling the selective reporting depending on the classification. For example, such filtering criteria could define that the report is sent for only certain classifications, while reporting of the detected network anomaly is suppressed for other classifications. Also, such filtering criteria could specify that for a certain classification the report should be sent together with an indication of the classification. Still further, such filtering criteria could be used to define a receiver of the report, i.e., to select the receiver of the report depending on the classification.

The network anomaly analyzer 40 may use various mechanisms to perform the classification of detected network anomalies.

In some implementations, the network anomaly analyzer 40 may use pattern matching. For this purpose, anomaly patterns of detected network anomalies may be stored in the anomaly database 50, and the network anomaly analyzer 40 may compare the anomaly pattern of a newly detected network anomaly to one or more of the stored anomaly patterns. The stored anomaly patterns may reflect the time at which the network anomaly or certain attributes thereof occur, the duration of the detected network anomaly, how often it occurs, or the like. Further, the stored anomaly pattern may also reflect a magnitude of the network anomaly, e.g., in terms of a value measured for a certain attribute, such as a rate of dropping messages or other data. If the newly detected pattern is found to be similar to one or more of the stored anomaly patterns, the network anomaly analyzer 40 may classify the newly detected network anomaly as expected behavior. At the same time, also the similar stored anomaly patterns could be labeled as being associated with expected behavior. The network anomaly analyzer may thus automatically learn anomaly patterns which should result in a classification as expected behavior. The network anomaly analyzer 40 may also analyze multiple stored anomaly patterns, which were detected in the past, to find regularities and assign network anomalies with occur regularly, e.g., once a year such as on New Years Eve, on a certain day of the week, or at another regularly recurring time instance, or network anomalies which are otherwise similar to the same class. Anomaly patterns may also be analyzed on a shorter timescale. For example, a sequence in which one or more attributes of the network data occur during a certain event with specific duration, e.g., a football game, could be analyzed. For example, attributes of such pattern could be defined by the number of SMS messages and/or voice calls in different time intervals during the event.

As mentioned above, correlation with external data from outside the communication network 100 may be used in addition or alternatively for performing the classification. Such external data may for example include information from an event calendar and specify the time and typically also location of a certain event in the service area of the communication network 100, such as a football game, concert, holiday. Another example is weather data, e.g., reflecting the time and/or location of heavy rainfall, heavy snowfall, thunderstorms, and/or other extreme weather conditions in the service area of the communication network 100. The network analyzer 40 may perform time-domain correlation and/or location domain correlation of the external data with the data representing a newly detected network anomaly to perform classification of the newly detected network anomaly. For example, if the time and location of the detected network anomaly matches with the time and location of a certain event, the network anomaly may be classified as expected due to the event. Similarly, if the time and location of the detected network anomaly matches with the time and location of specific weather conditions, the network anomaly may be classified as being due to the specific weather conditions. In another example, the detected network anomaly could be due to a power outage in a part of the service area, which may cause nodes in the communication network to switch to battery backup power and send corresponding notifications. Accordingly, using corresponding information from a supplier, the network anomaly detector 40 may classify the detected network anomaly as expected due to power outage. Similarly, a detected network anomaly could also be due to irregular behavior of some nodes when switching back from battery backup power to normal power, which is a critical situation in which reporting is typically desirable.

Similar classification may also be performed for stored network anomalies, and the classification on the basis of external data may be used for assigning the stored anomaly patterns to a class, e.g., by labeling them according to the result of the correlation with the external data. By using the pattern matching and the correlation with external data in combination, the network anomaly analyzer 40 may thus obtain stored anomaly patterns which are assigned to one or more classes. Such classes may be indicated by labels stored together with the anomaly pattern. For example, such labels could simply indicate that the anomaly pattern is associated with expected behavior, e.g., using the label "EXPECTED".

Further, more complex labels could be utilized, which also indicate additional information, e.g., a reason for the expected behavior. For example, such complex label could indicate "EXPECTED DUE TO WEATHER". Still further, combinations of different labels could be used, such as the combination of "EXPECTED" and "FOOTBALL" or the combination of "EXPECTED" and "RAINFALL".

In addition or as an alternative, stored anomaly patterns could also be manually classified and labeled by a human operator, or a human operator could verify the automatically generated classification of stored anomaly patterns.

In some implementations, network anomaly analyzer may also use a network anomaly model to perform the classification of the detected network anomaly. Such model may for example be created by analyzing one or more stored anomaly patterns and determining a model which reproduces one or more characteristics of the analyzed anomaly patterns. Rather than comparing the anomaly pattern of a newly detected network anomaly to stored anomaly patterns of previously detected network anomalies, the anomaly pattern of the newly detected anomaly pattern may be compared to the anomaly mode. This may facilitate the comparison process and may also provide more accurate results, because the anomaly model is less susceptible to random variations than individual stored anomaly patterns. Similar to a stored anomaly pattern, the anomaly model may be assigned to one or more classes, which may be indicated by storing the anomaly model together with one or more labels, as mentioned above.

Figure 2:
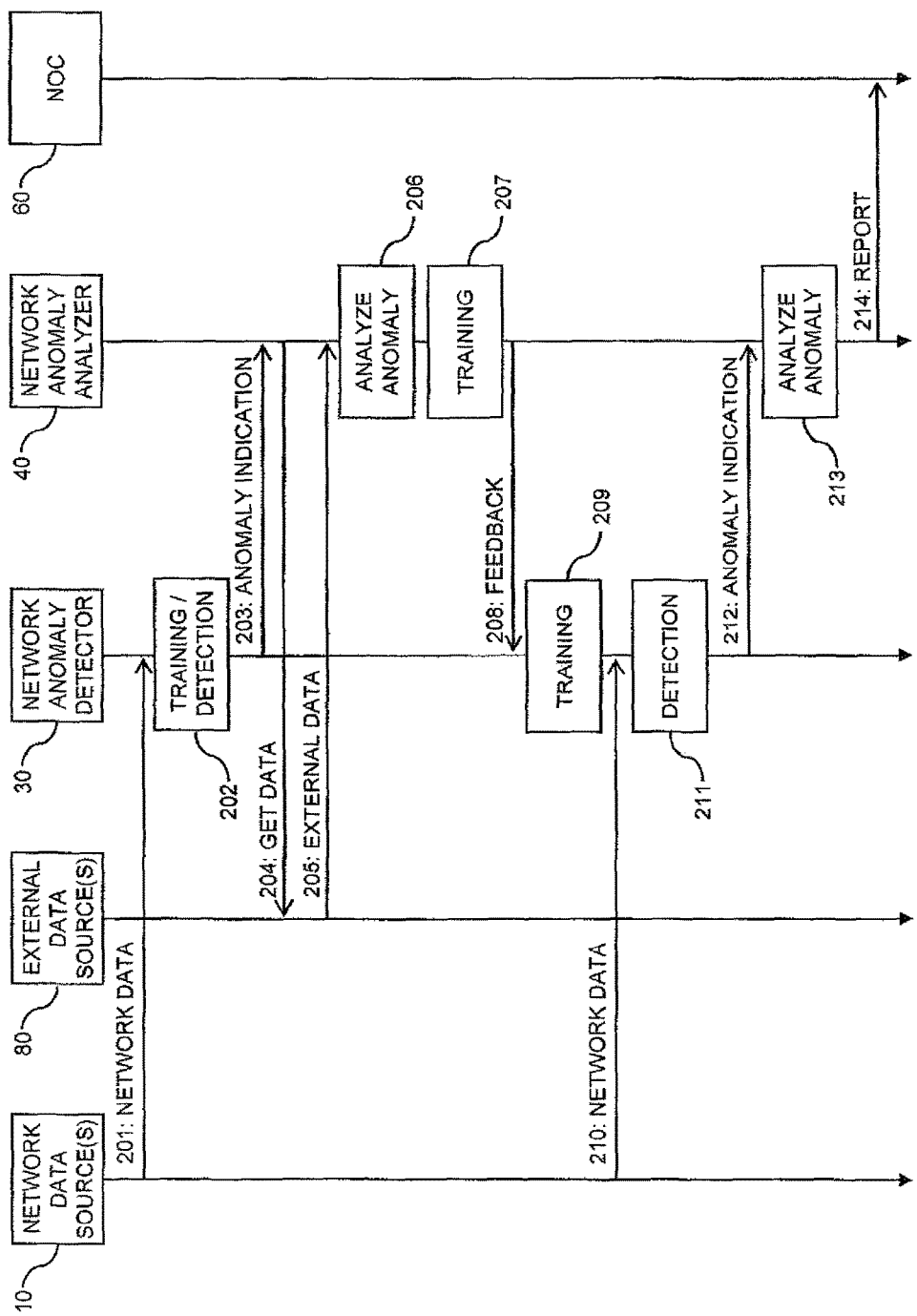
FIG. 2 illustrates exemplary processes for analysis of a network anomalies in accordance with an embodiment of the invention.

FIG. 2 illustrates exemplary procedures which are based on the above-concepts for analyzing network anomalies. The procedures of FIG. 2 involve one or more network data sources 10, e.g., located in the radio access network 110 and/or in the core network 120, one or more external data resources providing external data from outside the communication network 100, such as event schedule information or weather data, the network anomaly detector 30, the network anomaly analyzer 40, and the NOC 60 as an exemplary node receiving reports of detected network anomalies.

In the illustrated procedures, the network data source(s) 10 may initially provide network data 201 to the network anomaly detector 30. The network data 201 may for example include a time series of attributes, such at traffic rates, message sending or dropping rates, handovers, or successful or unsuccessful connection setup attempts in a sequence of time intervals. The network data may also be location referenced, i.e., include an indication of the location within the service area of the communication network 100 to which the network data 201 pertains.

Such location could for example be indicated in terms of a geographical position and/or by specifying one or more cells 111, 112, 113, 114, 115, 116 of the communication network 100.

The network anomaly detector 30 receives the network data 201 and may then use the network data for performing training of a model or pattern based network anomaly detection algorithm, as indicated by step 202. Further, the network anomaly detector 30 analyzes the network data 201 to detect network anomalies. In the example of FIG. 2, it is assumed that the network anomaly detector 30 detects a network anomaly and provides an indication 203 of the detected network anomaly to the network anomaly analyzer 40. The indication 203 includes data representing the detected network anomaly in terms of its time, e.g., as a timestamp, and/or location, e.g., as geographical location or as cell or group of cells, and in terms of an anomaly pattern with a time series of attributes. Further information could be included as well, e.g., one or more values quantifying the network anomaly in terms of magnitude and/or duration or information specifying the attribute(s) in which the network anomaly was detected.

As illustrated by messages 204, 205, the network anomaly analyzer 40 may then obtain external data 205 from the external data source(s) 80. Such external data 205 may for example be weather data, information from an event schedule, or information on a disaster relating to the location of the detected network anomaly.

Using the data representing the detected network anomaly as received from the network anomaly detector 30 in the indication 203 and the external data 205, the network anomaly analyzer 40 then analyzes the detected network anomaly, as indicated by step 206. In the illustrated example, it is assumed that as a result of the analysis of step 206 the detected network anomaly is classified as expected behavior. For example, the analysis could reveal that the time and location of the detected network anomaly correlates with heavy rainfall, and the detected network anomaly results from poor radio conditions due to the heavy rainfall and is expected behavior. The network anomaly analyzer 40 may thus store the anomaly pattern of the detected network anomaly in the anomaly database 50 (not shown in FIG. 2) and provide the stored anomaly pattern with the labels "EXPECTED" and "RAINFALL".

Further, the network anomaly analyzer 40 may also perform training of an anomaly model which reproduces characteristics of the anomaly model, as indicated by step 207. For example, averaging, wavelet representation, or fitting of an analytical function to the anomaly pattern could be used. Further, allowed deviation ranges for pattern matching could be adjusted, e.g., by statistic evaluation of the approximation procedure. As a result, also an anomaly model could be obtained which stored in the anomaly database 50 (not shown in FIG. 2) and provide the stored anomaly pattern with appropriate labels, such as "EXPECTED" and "RAINFALL" when assuming the above example of poor radio conditions due to heavy rainfall.

Due to the detected network anomaly being classified as expected, the network anomaly analyzer 40 refrains from further reporting of the detected network anomaly.

As further illustrated, the network anomaly analyzer 40 may provide feedback 208 to the network anomaly detector 30. The network anomaly detector 30 may use the feedback 208 for performing further training of the utilized network anomaly detection algorithm, as indicated by step 209. In particular, the feedback 208 may be used to improve representation of normal network behavior by the network anomaly detection algorithm.

The network anomaly detector 30 may then receive further network data 210, which are analyzed by the network anomaly detector 30 to detect a further network anomaly, as indicated by step 211. The network anomaly detector 30 provides an indication 212 of the detected network anomaly to the network anomaly analyzer 40. The indication 212 includes data representing the detected network anomaly in terms of its time and/or location and in terms of an anomaly pattern with a time series of attributes.

Using the data representing the detected network anomaly as received from the network anomaly detector 30 in the indication 212 and the stored anomaly pattern and/or anomaly model as obtained from steps 206 and 207, respectively, the network anomaly analyzer 40 then analyzes the detected network anomaly, as indicated by step 213. In the illustrated example, it is assumed that as a result of the analysis of step 213 the detected network anomaly is classified as unexpected behavior because it does not match with any stored anomaly pattern or anomaly model. The network anomaly analyzer 40 thus proceeds by sending a report of the detected network anomaly to the NOC 60. Further, the network anomaly analyzer 40 may store the anomaly pattern of the detected network anomaly in the anomaly database 50, so that it can be used for future analyses.

Figure 3:
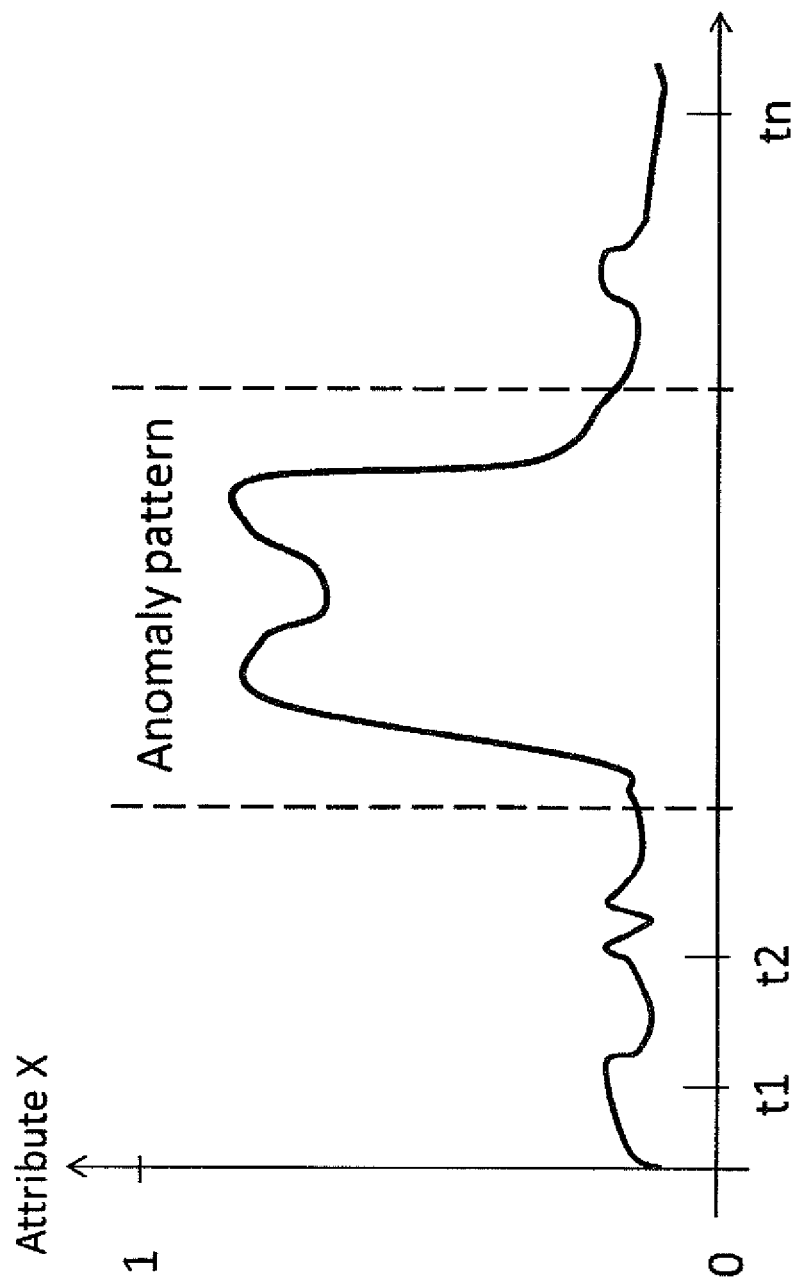
FIG. 3 illustrates an exemplary anomaly pattern which may be used in an embodiment of the invention.

FIG. 3 shows an exemplary anomaly pattern which may be used in the above procedures. As illustrated, the anomaly pattern occurs in a time-series of attributes of the network data. For a series of time instances t1, t2, . . . , tn, e.g., identified by timestamps, one or more attributes may be determined from the monitored network traffic. In the illustrated example, an exemplary attribute is referred to as "X" and is measured by a value ranging from 0 to 1. The value of the attribute "X" may for example be a measure of the rate of successful or unsuccessful attempts of connecting to UEs, the rate of sent messages of a certain type, e.g., SMS messages, the rate of dropped data, the rate of a certain alarm, typically as monitored in a given location or part of the service area, e.g., defined in terms of geographical location or in terms of one or more cells. The anomaly pattern, in FIG. 3 illustrated between the vertical dashed lines, constitutes a deviation from the normal behavior of the attribute. In the illustrated concepts, such anomaly pattern may be forwarded to the network anomaly analyzer so as to be used for the classification of the detected network anomaly.

Figure 4:
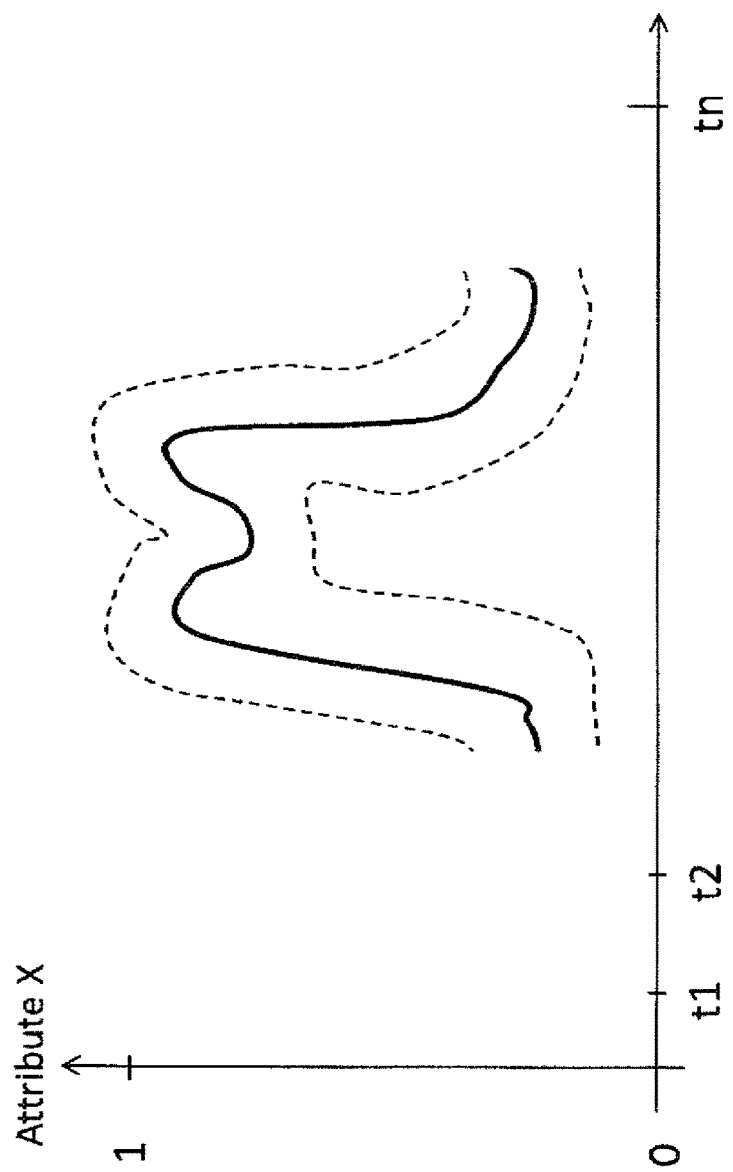
FIG. 4 illustrates an exemplary anomaly model which may be used in an embodiment of the invention.

An example of an anomaly model which may be generated to reproduce the anomaly pattern of FIG. 3 is schematically illustrated in FIG. 4. For example, the anomaly model may be based on grouping a number of similar detected anomaly patterns and determining a model function which approximates the grouped anomaly patterns, e.g., by averaging, wavelet representation, or fitting to an analytical function. In FIG. 4, dashed lines illustrate 25% and 75% quartiles from the statistic of such approximations.

The pattern matching may for example be based on Euclidian distance. That is to say, the two patterns may be considered to match if the Euclidian distance between them is short, e.g., below a threshold value. The pattern matching could also be based on Dynamic Time Warping (DTW) or wavelets. If an anomaly model as for example used illustrated in FIG. 4 is used, an anomaly pattern may for example be considered to match to the anomaly model if it is within the 25% and 75% quartile range or some other range which can be derived from the approximation statistics of the anomaly model, e.g., a range defined using other percentile values. The matching between two patterns may also involve normalizing the patterns to the same range, e.g., between 0 and 1, and/or smoothing the attribute values, e.g., using a moving average function.

As mentioned above, the network anomaly analyzer 40 may also analyze patterns to determine if the same anomaly pattern occurs repeatedly at the same location. If a periodicity or other kind of regularity is detected, the network anomaly analyzer 40 may classify the similar anomaly patterns as expected, and may also extrapolate the determined regularity to the future, which may then be used for the classification of newly detected network anomalies. Examples of such regularities include network anomalies occurring at the same time of each day, on the same day of each week, on the same day of each month, on the same day of each quarter, on the same day of each year, e.g., due to holidays such as Christmas, Thanksgiving, or the like.

The external data may be used to label the anomaly patterns or anomaly models and thereby refine classification. For example, if the time and/or location a detected network anomaly correlates with certain external data, e.g., an event such as a football game, the its anomaly pattern may be stored with a corresponding label, e.g., "FOOTBALL".

Figure 5:
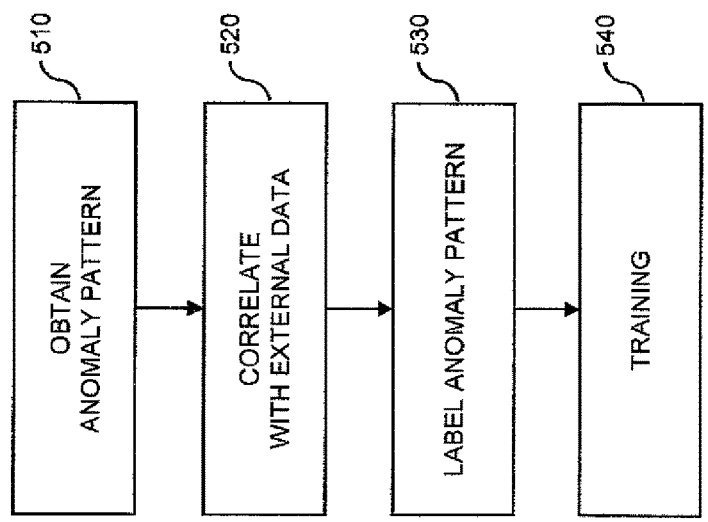
FIG. 5 shows a flowchart for illustrating a method according to an embodiment of the invention.

FIG. 5 shows a method which may be used for implementing training of the network anomaly analyzer 40.

At step 510, the network anomaly analyzer 40 obtains an anomaly pattern. The anomaly pattern may be received together with an indication of a detected network anomaly from the network anomaly detector 30. The anomaly pattern may be defined as explained in connection with the example of FIG. 3.

At step 520, the network anomaly analyzer 40 correlates the anomaly pattern with external data. As mentioned above, this may for example involve time-domain correlation and/or location domain correlation with the external data. The external data may for example include information from an event schedule or weather data.

At step 530, the anomaly pattern is labeled according to the result of the correlation of step 520. For example, if the time and typically also location of the network anomaly correlates with the time and/or location of a certain event indicated by the external data, e.g., a football game or concert, the anomaly pattern may be labeled accordingly, e.g., with the label "FOOTBALL". Further, if the time and typically also location of the network anomaly correlates with specific weather conditions indicated by the external data, the anomaly pattern may be labeled accordingly, e.g., with the label "SUNNY" or "RAINFALL".

Figure 6:
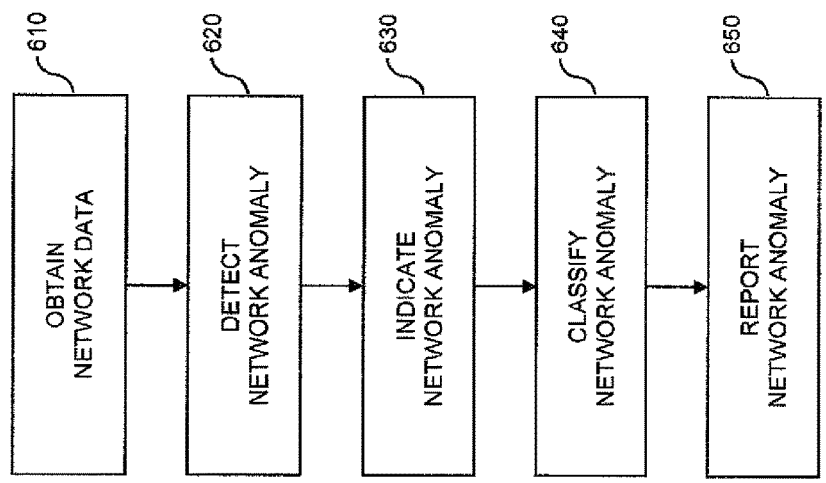
FIG. 6 shows a flowchart for illustrating a further method according to an embodiment of the invention.

At step 540, the labeled anomaly pattern is used for training. This may involve storing the labeled anomaly pattern. In addition or as an alternative, this may involve determining an anomaly model, such as explained in connection with FIG. 4, or adapting such anomaly model, using the anomaly pattern as input data for approximation procedures which are applied to determine the anomaly model. Specifically, the labeled anomaly pattern may be used together with other anomaly patterns with the same label to determine or adapt the anomaly model. FIG. 6 shows a method which may be used for implementing an overall process for analyzing a network anomaly by a system which includes the network anomaly detector 30 and the network anomaly analyzer 40.

At step 610, the network anomaly detector 30 obtains network data. As mentioned above, these network data may be obtained by monitoring the communication network 100, and various nodes of the communication network 100, e.g., in the radio access network 110 and/or in the core network 120, may act as sources of the network data. The network data may be provided as a time-series of one or more attributes, such as traffic load, sending rate or drop rate of a certain message, rate of alarms, successful or unsuccessful attempts of connecting UEs, a rate of handovers, or the like.

At step 620, the network anomaly detector 30 detects a network anomaly in the network data. As mentioned above, this is typically accomplished by identifying one or more attributes deviating from their normal behavior. Various network anomaly detection algorithms may be used for this purpose, e.g., model based algorithms or statistic algorithms.

At step 630, the network anomaly detector 30 indicates the detected network anomaly to the network anomaly analyzer 40. This is be accomplished together with data representing the detected network anomaly, e.g., indicating its time and/or location. The data representing the detected network anomaly may also include an anomaly pattern extracted from the network data, e.g., a subset of the network data which includes the deviating attribute(s) identified at step 620.

At step 640, the network anomaly analyzer 40 classifies the detected network anomaly. This may be accomplished on the basis of a previous training using external data, e.g., as in the method of FIG. 5. For example, pattern matching to a stored anomaly pattern or anomaly model may be used for the classification. The classification may distinguish between expected and unexpected behavior. For example, if the anomaly pattern matches to a stored anomaly pattern or to an anomaly model, the detected network anomaly may be classified as expected behavior. Finer classifications are possible as well.

At step 650, the network analyzer 40 may report the detected network anomaly, e.g., by sending a report to the NOC or some other node. This reporting is performed depending on the classification of step 640. For example, if the detected network anomaly is classified as expected behavior, reporting of the detected network anomaly may be suppressed, e.g., by not sending a report or not considering the detected network anomaly in a report. In some implementations also more complex filtering criteria may defined for controlling the selective reporting depending on the classification. For example, such filtering criteria could define that the report is sent for only certain classifications, while reporting of the detected network anomaly is suppressed for other classifications, even such other classification corresponds to expected behavior. Also, such filtering criteria could specify that for a certain classification the report should be sent together with an indication of the classification. Still further, such filtering criteria could be used to define which node should receive the report, i.e., to select the receiver of the report depending on the classification. The filtering criteria may also be configurable, e.g., by the node(s) potentially receiving the report, so that it can be flexibly controlled which classification should trigger reporting and which should not.

Figure 7:
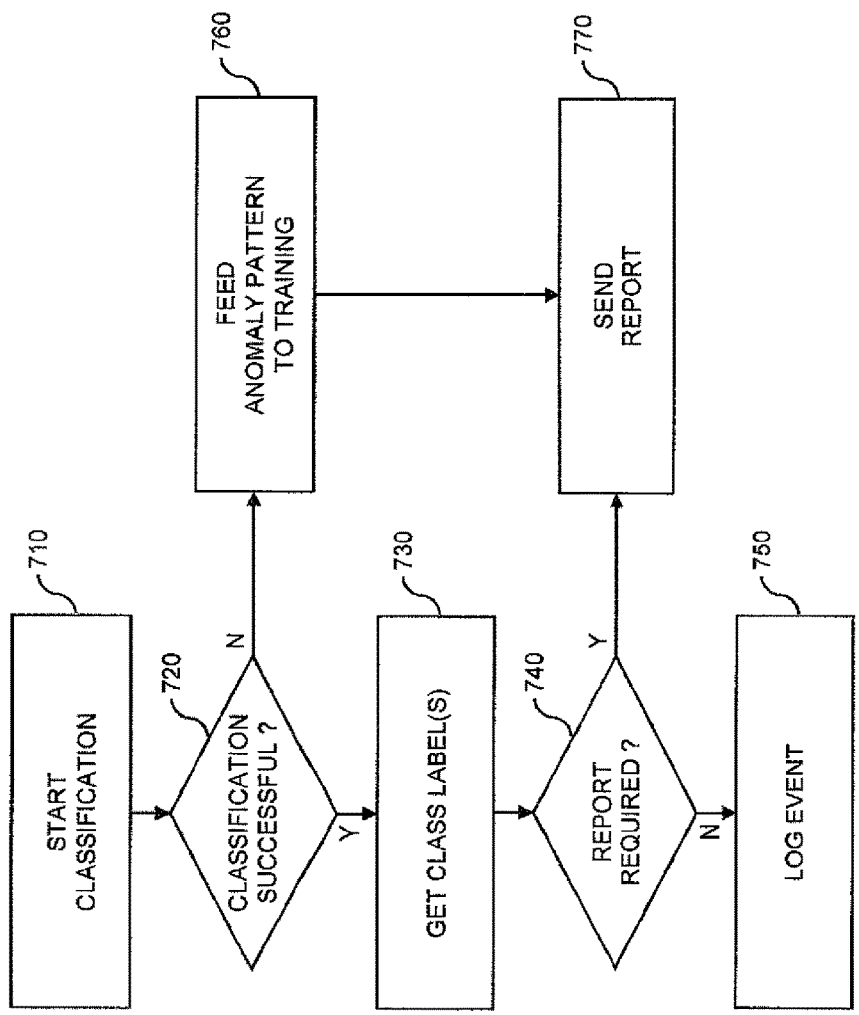
FIG. 7 shows a flowchart for illustrating a further method according to an embodiment of the invention.

The selective reporting of the detected network anomaly by the network anomaly analyzer 40 may for example be implemented by the method of FIG. 7.

At step 710, the network anomaly analyzer 40 starts the classification process, e.g., by performing pattern matching with respect to one or more stored anomaly patterns and/or one or more anomaly models, which were labeled as explained above.

At step 720, the network anomaly analyzer 40 checks whether the classification of the detected network anomaly was successful. If this is the case, as indicated by branch "Y", the network anomaly analyzer 40 proceeds with step 730.

At step 730, the network anomaly analyzer 40 gets the label(s) of the stored anomaly pattern or anomaly model to which the match was found.

At step 740, the network anomaly analyzer 40 checks, on the basis of the label(s), whether sending of a report for this detected network anomaly is required. For example, if the labels indicate a certain kind of expected behavior, e.g., due to a football game or specific weather conditions, the network anomaly analyzer 40 may determine that sending of a report is not required and proceed to step 750, as indicated by branch "N".

At step 750, the network anomaly analyzer 40 may log the event corresponding to the detection an successful classification of the network anomaly. In addition, the network anomaly analyzer 40 may also store the anomaly pattern of the detected network anomaly, e.g., to be used in training an anomaly model.

If the check of step 720 reveals that classification was not successful, i.e., no matching stored anomaly pattern or anomaly model was found, the network anomaly analyzer 40 classifies the network anomaly as unexpected and proceeds to step 760, as indicated by branch "N".

At step 760, the network anomaly analyzer 40 feeds the anomaly pattern to a training process, e.g., by storing the anomaly pattern for future pattern matching attempts or by using the anomaly pattern to create a new anomaly model.

At step 770, the network anomaly analyzer 40 sends a report of the detected network anomaly.

If the check of step 740 reveals that sending of a report is required, the network anomaly analyzer 40 proceeds to step 760 as well to send the report. This may for example be the case if a label indicates that an expected behavior is critical.

The report which is sent at step 760 may also include the result of the classification, e.g., indicate the label or class of the detected network anomaly. Such information may be valuable for the receiver of the report because it facilitates reacting to the network anomaly. If the detected network anomaly was classified as unexpected behavior, this could be indicated as well. In the case of unexpected behavior, the receiver of the report, e.g., the NOC 60, could return information on the detected network anomaly, e.g., in the form of a label. Such information may then be used by the network anomaly analyzer 40 in future classification processes.

As can be seen from the method of FIG. 7, the network anomaly analyzer 40 may continuously aggregate new information for training which may allow for dynamic adaptation of the network anomaly analyzer 40 to new classes of network anomalies and/or to improve accuracy of classification.

Figure 8:
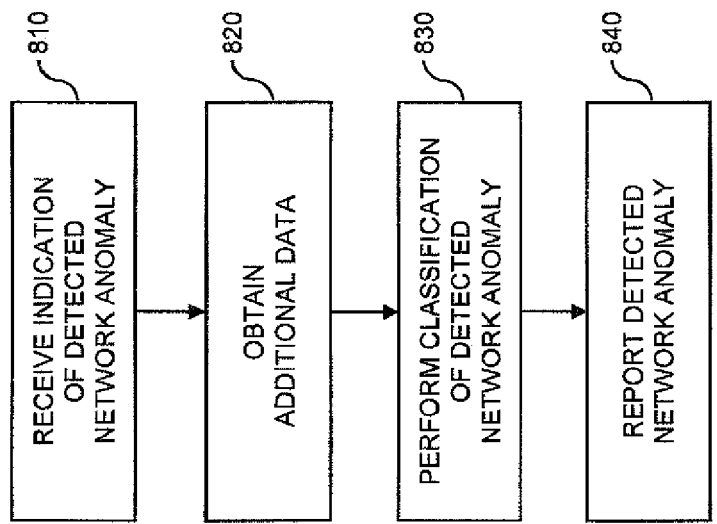
FIG. 8 shows a flowchart for illustrating a further method according to an embodiment of the invention.

FIG. 8 illustrates a further method for analyzing network anomalies in a communication network. The method of FIG. 8 may be used to implement the above concepts in a device for analyzing detected network anomalies, such as the network anomaly analyzer 40. That is to say, the steps of the method of FIG. 8 may be performed by such device for analyzing detected network anomalies.

At step 810, an indication of a network anomaly is received, which was previously detected by monitoring the communication network.

At step 820, additional data may be obtained. The additional data may include information from outside the communication network, i.e., external data. Such information from outside the communication network may for example include information on events in a service area of the communication network, e.g., from an event schedule. Examples of such events are events attracting a large audience, such as football games or concerts, holidays, disasters, or the like. The information may for example specify the timing, such as time and/or duration, or location of the events. Such information from outside the communication network may also include information on the weather in a service area of the communication network, e.g., specifically with respect to a certain location or within the service area or in a certain part of the service area. The additional data include information on one or more previously detected network anomalies, such as the above-mentioned stored anomaly patterns or anomaly models.

At step 830, classification of the detected network anomaly is performed. This is accomplished on the basis of data representing the detected network anomaly and on the basis of the additional data form step 820. The classification of the detected network anomaly may be based on pattern matching with respect to anomaly information obtained from the information on one or more previously detected network anomalies, such as the above-mentioned stored anomaly patterns or anomaly models.

The classification of the detected network anomaly distinguishes between expected behavior and unexpected behavior. Finer or other classifications are possible as well.

The data representing the detected network anomaly, which may be received together with the indication of step 810, may include a timing of the detected network anomaly, e.g., specify a start time, end time, and/or duration of the detected network anomaly. Further, the data representing the detected network anomaly comprise a location of the detected network anomaly, e.g., in terms of a geographical location or in terms of a certain part of the service area of the communication network, e.g., a cell or group of cells.

The classification of the detected network anomaly may be based on time-domain correlation of the data representing the detected network anomaly with the additional data and/or on location-domain correlation of the data representing the detected network anomaly with the additional data.

At step 840, a report of the detected network anomaly is provided. This is accomplished depending on the classification of step 830. For example, if the detected network anomaly was classified as expected behavior, reporting of the detected network anomaly may be suppressed, e.g., by not sending the report or not considering the detected network anomaly in the report. In some implementations also more complex filtering criteria may defined for controlling the selective reporting depending on the classification. For example, such filtering criteria could define that the report is sent for only certain classifications, while reporting of the detected network anomaly is suppressed for other classifications, even such other classification corresponds to expected behavior. Also, such filtering criteria could specify that for a certain classification the report should be sent together with an indication of the classification. Still further, such filtering criteria could be used to define which node should receive the report, i.e., to select the receiver of the report depending on the classification. The report may also indicate a result of the classification. The filtering criteria may also be configurable, e.g., by the node(s) potentially receiving the report, so that it can be flexibly controlled which classification should trigger reporting and which should not.

In some implementations, feedback may be provided to a network anomaly detector used for detecting the network anomaly, such as with message 208. Also this feedback may depend on the result of the classification. In some implementations, it is also possible that the additional data include feedback which was received in response to the report of previously detected and reported network anomaly.

Figure 9:
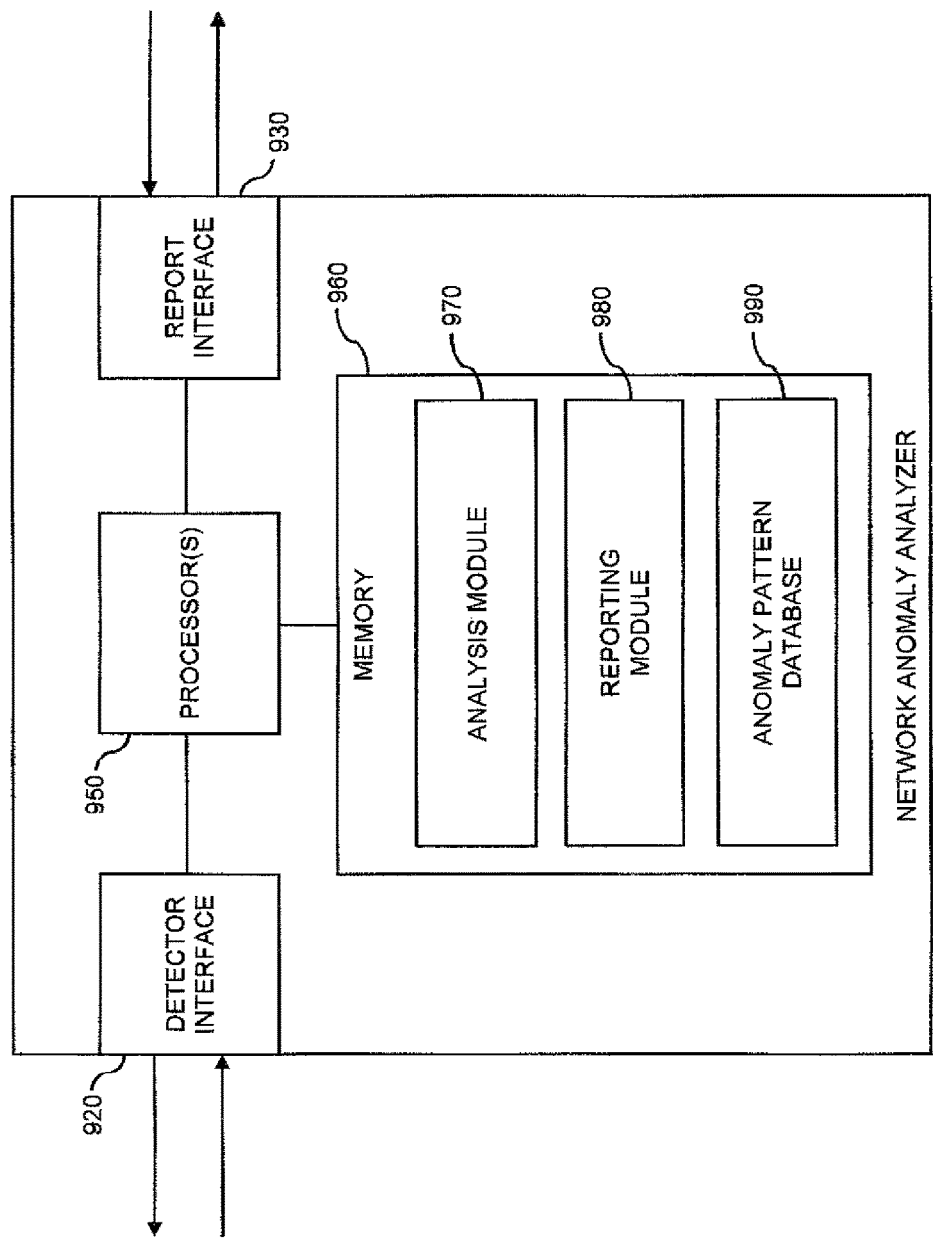
FIG. 9 schematically illustrates structures of a network anomaly analyzer according to an embodiment of the invention.

FIG. 9 illustrates an exemplary implementation of a device for analyzing network anomalies which may be used to implement the above concepts. For example, the illustrated structures may be used to implement the above-described functionalities of the network anomaly analyzer 40.

In the illustrated example, the device includes a detector interface 920, which may be used for communication with at least one network anomaly detector, such as the network anomaly detector 30. For example, the detector interface 920 may be used for receiving the indication of the detected network anomaly. Further, the detector interface 920 may be used for providing feedback to the network anomaly detector, such as in message 208. In addition, the device may include a report interface 930. The report interface 930 may be used for sending the report of the detected network anomaly to at least one other node, e.g., the NOC. Further, the report interface 930 could be used for receiving feedback information from such other node, e.g., a label to be used for future classification of similar network anomalies.

Further, the device includes one or more processor(s) 950 coupled to the interfaces 920, 930 and a memory 960 coupled to the processor(s) 950. The memory 960 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 960 includes suitably configured program code modules to be executed by the processor(s) 950 so as to implement the above-described functionalities of the network anomaly analyzer 40. More specifically, the program code modules in the memory 960 may include an analysis module 970 so as to implement the above-described functionalities for analyzing anomaly patterns to perform classification of a detected network anomaly, e.g., by pattern matching and/or correlation with external data. Further, the program code modules in the memory 960 may include a reporting module 980 so as to implement the above-mentioned functionalities of selectively sending a report of a detected network anomaly. Still further, the memory 960 may include an anomaly database 990 for storing anomaly patterns or anomaly models. Accordingly, the device may also integrate functionalities of the anomaly database 50.

It is to be understood that the structure as illustrated in FIG. 9 is merely schematic and that the device may actually include further components which, for the sake of clarity, have not been illustrated, e.g., further interfaces or further processors. Also, it is to be understood that the memory 960 may include further types of program code modules, which have not been illustrated, e.g., program code modules for implementing known pattern analysis functionalities, training algorithms, approximation algorithms, and/or comparison algorithms.

In some implementations, also a computer program may be provided for implementing functionalities of the network anomaly analyzer 40, e.g., in the form of a physical medium storing the program code modules to be stored in the memory 960 or by making such program code available for download.

As can be seen, the concepts as described above may be used for efficiently analyzing and reporting network anomalies. Unnecessary reporting or false alarms can be avoided by the classification. The network anomaly analyzer may operate as a filter for filtering out detected network anomalies which can be considered as uncritical or irrelevant. Further, the classification may provide valuable additional information which may be included into the report. Moreover, the two-stage process of the illustrated concepts allows for a modular design with various kinds of network anomaly detectors or even multiple network anomaly detectors.

It is to be understood that the examples and embodiments as explained above are merely illustrative and susceptible to various modifications. For example, the concepts could be used in connection with various types of communication networks without limitation to the examples of communication networks mentioned herein. Moreover, it is to be understood that the above concepts may be implemented by using correspondingly designed software to be executed by one or more processors of an existing device, or by using dedicated device hardware. Also, the network anomaly analyzer as described herein may be implemented by a single device or by multiple devices, e.g., a device cloud or system of cooperating devices.

The invention claimed is:

1. A method performed in a device that analyzes network anomalies in a communication network, the method comprising:
receiving an indication of a network anomaly which was detected by monitoring the communication network;
responsive to receiving the indication, communicating, to a data source external to the communication network, a request for scheduled event information from outside of the communication network;
responsive to receiving the scheduled event information from outside of the communication network, identifying a previously detected network anomaly associated with a scheduled event that previously occurred outside of the communication network based on the scheduled event information received from outside of the communication network;
responsive to identifying the previously detected network anomaly, determining a classification of the detected network anomaly as unexpected behavior based on a determination that the detected network anomaly is not similar to the previously detected network anomaly associated with the scheduled event that previously occurred outside of the communication network;
responsive to determining the classification of the detected network anomaly as unexpected behavior, providing a report of the detected network anomaly in response to the classification of the detected network anomaly as unexpected behavior;
responsive to identifying the previously detected network anomaly, determining a classification of the detected network anomaly as expected behavior of the communication network based on a determination that the previously detected network anomaly associated with the scheduled event occurring outside of the communication network is similar to the detected network anomaly; and
responsive to determining the classification of the detected network anomaly as expected behavior, suppressing reporting of the detected network anomaly.

2. The method according to claim 1, wherein the scheduled event information from outside the communication network comprises information on the scheduled event that previously occurred in a location of a service area of the communication network.

3. The method according to claim 1,
wherein determining said classification of the detected network anomaly as unexpected behavior further comprises:
obtaining one or more anomaly patterns associated with the previously detected network anomaly associated with the scheduled event that previously occurred outside of the communication network;
determining a new anomaly pattern based on the detected network anomaly; and
comparing the new anomaly pattern to the one or more anomaly patterns associated with the previously detected network anomaly associated with the scheduled event that previously occurred outside of the communication network; and
determining the classification of the detected network anomaly as unexpected behavior based on the new anomaly pattern not matching the obtained one or more anomaly patterns associated with the previously detected network anomaly associated with the scheduled event that previously occurred outside of the communication network.

4. The method of claim 3, wherein the new anomaly pattern includes a time series of behavior of an attribute of network data that deviates from a normal behavior of the attribute of network data.

5. The method according to claim 1,
wherein data representing the detected network anomaly comprises at least one of:
a timing of the detected network anomaly; and
a location of the detected network anomaly.

6. The method according to claim 1, further comprising:
determining a time-domain correlation of data representing the detected network anomaly with the scheduled event that previously occurred outside of the communication network; and
determining a location-domain correlation of the data representing the detected network anomaly with the scheduled event that previously occurred outside of the communication network.

7. The method according to claim 1, further comprising:
in response to determining the classification as unexpected behavior, providing feedback to a network anomaly detector used for detecting the network anomaly.

8. The method of claim 1, wherein the scheduled event information comprises a schedule of events in the location of the service area of the communication network.

9. The method of claim 1, further comprising:
responsive to providing the report, receiving feedback information to classify future detected network anomalies similar to the detected network anomaly as expected behavior.

10. A device for analyzing network anomalies in a communication network, the device comprising at least one processor,
wherein the at least one processor is configured to:
receive an indication of a network anomaly which was detected by monitoring the communication network;
responsive to reception of the indication, communicate, to a data source external to the communication network, a request for scheduled event information from outside of the communication network;
responsive to reception of the scheduled event information from outside of the communication network, identify a previously detected network anomaly associated with a scheduled event that previously occurred outside of the communication network based on the scheduled event information received from outside of the communication network;
responsive to the identification of the previously detected network anomaly, determine a classification of the detected network anomaly as unexpected behavior based on a determination that the detected network anomaly is not similar to the previously detected network anomaly associated with the scheduled event that previously occurred outside of the communication network;
responsive to the determination of the classification of the detected network anomaly as unexpected behavior, provide a report of the detected network anomaly in response to the classification of the detected network anomaly as unexpected behavior;
responsive to the identification of the previously detected network anomaly, determine a classification of the detected network anomaly as expected behavior of the communication network based on a determination that the previously detected network anomaly associated with the scheduled event occurring outside of the communication network is similar to the detected network anomaly; and responsive to the determination of the classification of the detected network anomaly as expected behavior, suppress reporting of the detected network anomaly.

11. The device according to claim 10, wherein the scheduled event information from outside the communication network comprises information on the scheduled event that previously occurred in a location of a service area of the communication network.

12. The device according to claim 10,
wherein the at least one processor is further configured to:
obtain one or more anomaly patterns associated with the previously detected network anomaly associated with the scheduled event that previously occurred outside of the communication network;
determine a new anomaly pattern based on the detected network anomaly; and
compare the new anomaly pattern to the one or more anomaly patterns associated with the previously detected network anomaly associated with the scheduled event that previously occurred outside of the communication network; and
determine the classification of the detected network anomaly as unexpected behavior based on the new anomaly pattern not matching the obtained one or more anomaly patterns associated with the previously detected network anomaly associated with the scheduled event that previously occurred outside of the communication network.

13. The device according to claim 10,
wherein data representing the detected network anomaly comprise at least one of:
a timing of the detected network anomaly; and
a location of the detected network anomaly.

14. The device according to claim 10,
wherein the at least one processor is further configured to:
determine a time-domain correlation of data representing the detected network anomaly with the scheduled event that previously occurred outside of the communication network; and
determine a location-domain correlation of the data representing the detected network anomaly with the scheduled event that previously occurred outside of the communication network.

15. The device according to claim 10,
wherein the at least one processor is configured to provide feedback to a network anomaly detector used for detecting the network anomaly in response to the determination of the classification of the detected anomaly as unexpected behavior.

16. The device according to claim 10, further comprising:
an interface for sending the report of the detected network anomaly; and
wherein the report comprises the classification of the detected network anomaly.

17. The device according to claim 10, further comprising: an interface for receiving the indication of the detected network anomaly from a network anomaly detector.

18. A system for analyzing network anomalies in a communication network, the system comprising:
a network anomaly detector device comprising a processor and memory; and
a network anomaly analyzer device comprising a processor and memory,
wherein the processor and memory of the network anomaly detector device are configured to detect a network anomaly by monitoring the communication network and provide an indication of the detected network anomaly to the network anomaly analyzer, and
wherein the processor and memory of the network anomaly analyzer device are configured to:
receive the indication of the detected network anomaly;
responsive to reception of the indication, communicate, to a data source external to the communication network, a request for scheduled event information from outside of the communication network;
responsive to reception of the scheduled event information from outside of the communication network, identify a previously detected network anomaly associated with a scheduled event that previously occurred outside of the communication network based on the scheduled event information received from outside of the communication network;
responsive to the identification of the previously detected network anomaly, determine a classification of the detected network anomaly as unexpected behavior based on a determination that the detected network anomaly is not similar to the previously detected network anomaly associated with the scheduled event that previously occurred outside of the communication network;
responsive to the determination of the classification of the detected network anomaly as unexpected behavior, provide a report of the detected network anomaly in response to the classification of the detected network anomaly as unexpected behavior;
responsive to the identification of the previously detected network anomaly, determine a classification of the detected network anomaly as expected behavior of the communication network based on a determination that the previously detected network anomaly associated with the scheduled event occurring outside of the communication network is similar to the detected network anomaly; and
responsive to the determination of the classification of the detected network anomaly as expected behavior, suppress reporting of the detected network anomaly.

19. A computer program product comprising a non-transitory computer readable storage medium storing program code to be executed by at least one processor of a device for analyzing detected network anomalies, wherein execution of the program code causes the at least one processor to perform steps of the method according to claim 1.

* * * * *